H. GIBBS.
HOSE NOZZLE.
APPLICATION FILED JAN. 2, 1913.
1,215,796.
Patented Feb. 13, 1917.
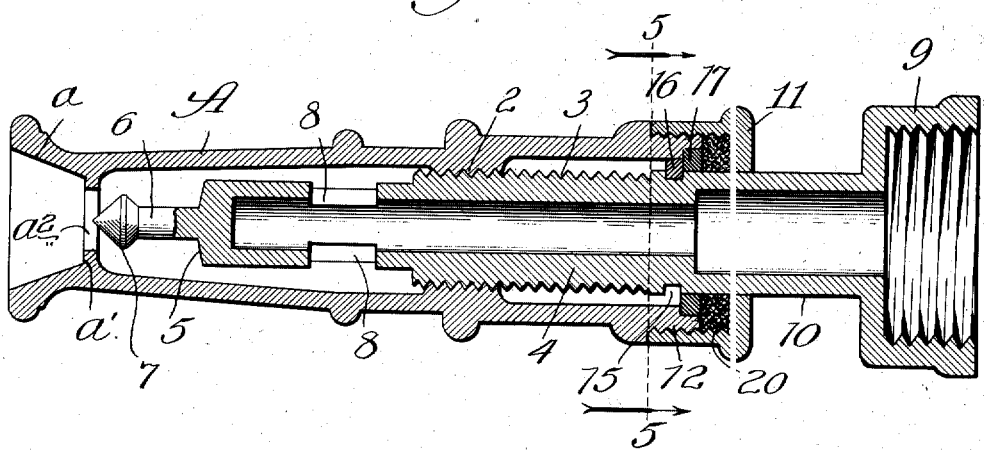
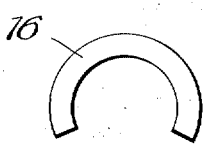
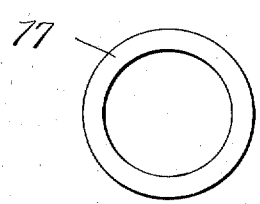
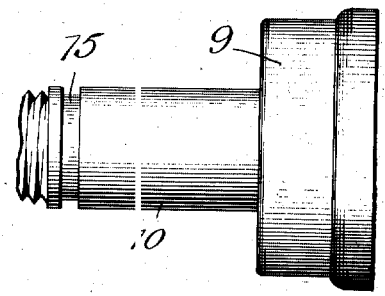
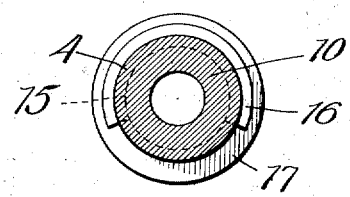
Witnesses:
Inventor:
Henry Gibbs

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-NOZZLE.

1,215,796.      Specification of Letters Patent.      Patented Feb. 13, 1917.

Application filed January 2, 1913. Serial No. 739,375.

*To all whom it may concern:*

Be it known that I, HENRY GIBBS, a citizen of the United States, and a resident of the city of Chicago, county of Cook, and State of Illinois, have invented certain new and useful Improvements in Hose-Nozzles, of which I do declare the following to be a full, clear, and exact description, reference being had to the accompanying drawing, forming part of this specification.

The present invention has for its object to provide an improvement in that class of hose nozzles whereby the water from the hose may be regulated and controlled so that it will issue either in the form of coarse spray, fine spray, or in a solid stream, an example of this type of hose nozzle being shown in Patent No. 319,149, granted to E. R. Tomlinson, June 2, 1885. The invention consists in the features of novelty hereinafter described, illustrated in the accompanying drawing and particularly pointed out in the claim at the end of this specification.

Figure 1 is a view in central longitudinal section through a nozzle embodying my invention. Fig. 2 is a view of the inner end of the spindle. Fig. 3 is a detail view of the collar for the spindle. Fig. 4 is a detail view of the retaining ring. Fig. 5 is a view in cross section through the spindle on line 5—5 of Fig. 1.

In the accompanying drawing, A designates the body of the nozzle, the outer end of which is formed with a flaring portion $a$ and an annular contracted portion $a'$ having an opening $a^2$ therein, the annular contracted portion $a'$ forming a seat for a valve, as will presently more fully appear. On its interior the body A is provided with a screw threaded portion 2 adapted to be engaged by the threaded portion 3 of a hollow spindle 4. At its outer end the spindle 4 is formed with a beveled portion 5 constituting a valve adapted to close against the inner portion of the valve seat adjacent the end of the body portion A, and from the valve seat projects a stem 6 carrying at its outer end a double cone 7 of slightly smaller diameter than the opening $a^2$ at the end of the body A. Through the walls of the hollow spindle 4, adjacent its outer end, are formed the openings 8 through which the water will discharge, as it passes through the spindle. The opposite or rear end of the spindle 4 is provided with an expanded portion 9 that is interiorly screw-threaded to permit it to be coupled to the end of the hose and from this expanded portion 9 to a point adjacent the inner end of the threaded portion 3 of the spindle extends the smooth, cylindrical part 10 of the nozzle. Over the cylindrical part 10 of the nozzle sets a cap 11 adapted to slide thereon, the interior of this cap being screw-threaded to engage the correspondingly exteriorly threaded portion 12 of the body A.

In order to enable the spindle 4 to be attached to the body A of the nozzle in such manner that leakage of water shall be prevented, I form the exterior of the spindle adjacent the inner end of its screw threaded portion 3 with an annular groove 15 adapted to receive a metal ring 16 that will be sprung or forced into the groove 15 and, after this metal ring 16 has been placed in position, it will project a slight distance beyond the periphery of the cylindrical portion 10 of the spindle, so as to hold in place a collar 17. Between this collar 17 and the end of the cap 11 is placed the packing material 20 to prevent the leakage of water.

In assembling the parts, the cap 11 will be slipped over the end and onto the cylindrical portion 10 of the spindle, after which the packing 20 and the loose collar 17 will be placed upon the cylindrical portion 10 of the spindle. The retaining ring 16 will then be sprung or forced into the groove 15 so as to limit the outward movement of the collar 17. The spindle will then be screw threaded into the body A of the nozzle and the cap 11 will be screwed onto the lower end of the nozzle, thus tightly compressing the packing 20 between the extreme inner end of the body A and the inner end of the cap 11.

My present invention affords an exceedingly cheap, simple and effective means for guarding against leakage between the parts of the nozzle.

It will be readily understood by those familiar with this class of devices, that the variations of the stream of water can be readily effected in the usual manner by the adjustment of the spindle within the body of the nozzle.

Having thus described my invention, what I claim as new, and desire to secure by Letters Patent, is:—

A hose nozzle, comprising a chambered body portion having interior screw threads at a distance from its inner end and exteriorly threaded at its inner end, a screw-threaded hollow spindle within said body portion, said spindle having a cylindrical portion adjacent its inner end and having an annular groove at the outer end of said cylindrical portion, a split spring ring having its ends spaced apart sufficiently to permit it to be forced laterally into said groove, said ring projecting beyond the surface of said cylindrical portion, a loose stop-collar encircling said cylindrical portion and fitting in a recess in the inner end of said body portion, a cap on said cylindrical portion of said spindle in engagement with the exterior screw-threads on said body portion, and a packing ring within said cap and clamped between the same and said stop-collar, substantially as described.

HENRY GIBBS.

Witnesses:
ELEANOR HAGUNOW,
KATHARINE GERLACH.